US011886384B2

(12) United States Patent
Perez et al.

(10) Patent No.: US 11,886,384 B2
(45) Date of Patent: Jan. 30, 2024

(54) DESTINATION-AGNOSTIC ITEM-KEEPING UI FOR HETEROGENOUS DIGITAL ITEMS

(71) Applicant: MICROSOFT TECHNOLOGY LICENSING, LLC, Redmond, WA (US)

(72) Inventors: Carlos German Perez, Redmond, WA (US); Todd S. Behrbaum, Redmond, WA (US); Wendy Lu, Seattle, WA (US); Matthew F. Gray, Oslo (NO); Daniela Dimitrova, Redmond, WA (US); Helen Anderson, Seattle, WA (US); Olga K. Dalecka, Redmond, WA (US); Jokko Juhana Korhonen, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 22 days.

(21) Appl. No.: 17/711,844

(22) Filed: Apr. 1, 2022

(65) Prior Publication Data
US 2023/0315686 A1 Oct. 5, 2023

(51) Int. Cl.
G06F 16/16 (2019.01)
G06F 16/13 (2019.01)

(52) U.S. Cl.
CPC .......... *G06F 16/168* (2019.01); *G06F 16/13* (2019.01)

(58) Field of Classification Search
CPC .............................. G06F 16/168; G06F 16/13
See application file for complete search history.

(56) References Cited

U.S. PATENT DOCUMENTS

| 7,289,812 B1 | 10/2007 | Roberts et al. |
| 11,604,656 B2* | 3/2023 | Kim ........................ G06F 9/455 |
| 2003/0233541 A1* | 12/2003 | Fowler ................ H04L 63/0823 |
| | | 713/155 |

(Continued)

OTHER PUBLICATIONS

Lukic, Dragan, "Beginners Guide to NextCloud (3 Minutes to Master)", Retrieved from: http://web.archive.org/web/20200809000342/https://help.rapidseedbox.com/en/articles/1451701-beginners-guide-to-nextcloud-3-minutes-to-master, Aug. 9, 2020, 10 Pages.

(Continued)

*Primary Examiner* — Angelica Ruiz
(74) *Attorney, Agent, or Firm* — Newport IP, LLC; Jacob P. Rohwer

(57) ABSTRACT

The techniques disclosed herein enable systems to centralize access to various digital items irrespective of the location of those digital items. To achieve this, items that are stored at their original location, e.g., within a cloud storage platform, can be selected by a user for storage at a centralized location such as a favorites section. These items are selected using an interface control which can be an operating system component of an item keeping system that is accessible in any context or application. The item keeping system can generate an item alias for selected items which is then stored in the centralized location. In addition, item aliases can be moved to various destinations by the user to enable customized item (Continued)

storage for items of varying types, origin, and location. In addition, functionality of the interface control can be modified to suite selected items.

20 Claims, 13 Drawing Sheets

(56) References Cited

U.S. PATENT DOCUMENTS

| | | | | |
|---|---|---|---|---|
| 2006/0161635 | A1* | 7/2006 | Lamkin | G06F 16/16 709/217 |
| 2008/0126919 | A1 | 5/2008 | Uskali et al. | |
| 2008/0276171 | A1* | 11/2008 | Sabo | G06F 16/168 715/711 |
| 2010/0217754 | A1 | 8/2010 | Ahn et al. | |
| 2012/0303629 | A1* | 11/2012 | Klein | G06F 16/907 707/E17.014 |
| 2014/0258349 | A1* | 9/2014 | Meltzer | G06F 16/182 707/827 |
| 2021/0397670 | A1* | 12/2021 | Cohen | G06F 3/04817 |

OTHER PUBLICATIONS

"International Search Report and Written Opinion Issued in PCT Application No. PCT/US23/011665", dated Apr. 28, 2023, 11 Pages.

"About Page Thumbnails", Retrieved from: https://web.archive.org/web/20190418011405/http:/helpx.adobe.com/acrobat/using/page-thumbnails-bookmarks-pdfs.html, Apr. 18, 2019, 6 Pages.

"How Do I Change the Default Save Location for Bookmarks Back to Bookmark Menu?", Retrieved from: https://support.mozilla.org/en-US/questions/1205291, Feb. 14, 2018, 6 pages.

"How to Create an Internet Favorite or Bookmark", Retrieved from: https://web.archive.org/web/20180830134539/https:/www.computerhope.com/issues/ch000858.htm, Aug. 30, 2018, 6 Pages.

"How to Import and Export Browser Bookmarks or Favorites", Retrieved from: https://web.archive.org/web/20190223201637/https:/www.computerhope.com/issues/ch000524.htm, Feb. 23, 2019, 14 Pages.

Huculak, Mauro, "How to Manage Favorites on Microsoft Edge", Retrieved from: https://www.windowscentral.com/how-manage-favorites-new-microsoft-edge, Mar. 23, 2021, 19 Pages.

* cited by examiner

DESTINATION-AGNOSTIC ITEM-KEEPING UI FOR HETEROGENOUS DIGITAL ITEMS

BACKGROUND

As computing becomes ever more integrated into modern workplaces, many organizations equip workers with productivity suites to enable viewing, editing, and storage of information. These productivity suites can include several programs or applications that enable users to produce documents, multimedia files, and other digital items from one main platform. Productivity suites can also enable the user to share data among the various programs and with other users through online collaboration and remote file storage. Typically, productivity suites can be accessed via computing devices such as a desktop computer or a laptop computer. In addition, productivity suites can be accessed by mobile devices such as smartphones and tablet computers.

Through significant investment by service providers, the versatility and functionality of modern productivity suites has greatly expanded. However, users of these productivity suites must contend with a growing number of applications and item types as a result. For example, a user may utilize one application to store and edit text documents, another application to create spreadsheet documents, still another application to schedule meetings with peers, and so forth.

Furthermore, the disparate digital items that are created by these applications may be stored in different locations (e.g., different network locations and/or different file locations). For instance, text documents, spreadsheets, and slideshow presentations may be stored in one location while digital design files are stored in another location, and yet meeting events with peers are stored in still another location. As such, while the various items may all relate to a particular task or project, the user must traverse several separate locations to access these items.

In addition, while some existing solutions allow users to "pin" items to a dashboard or add items to a favorites list, these functions are typically still isolated within the immediate context. For example, a file explorer may support favoriting various items, yet the favorites list can still only be accessed through the specific file explorer. Similarly, while a web browser may enable a user to bookmark a particular webpage the user must return to the specific web browser to access the bookmark leading to a cumbersome and degraded user experience. Thus, there is a need for mechanisms to unify item keeping at an operating system level to enable users to access saved items irrespective of storage location or platform.

It is with respect to these and other considerations that the disclosure made herein is presented.

SUMMARY

The disclosed techniques enhance the functionality of operating systems and associated storage systems for digital items such as documents, multimedia files, and the like through the introduction of a stasher control and a unified favorites and folders system. Generally described, various digital items can be stored at a first location such as a local file explorer, a cloud storage platform, a web browser, and the like. A user may select an item to summon an item storage control to select a destination for the item (e.g., a favorites list). An item alias can be stored at the selected destination to enable access to the item irrespective of the actual location of the item.

In various examples, a plurality of items can be stored at the first location. For instance, items that originate from the same application may be stored together such as design files or text documents. As will be elaborated upon below, a user can select an item to cause a display of an item storage interface control. In various examples, an initial selection can cause an item alias associated with the selected item to be stored at a centralized location (e.g., the favorites list). In addition, the user may return to the item to expand the item storage interface control to reveal additional options with respect to the item and/or the item alias.

Using an additional selection, the user may store the item alias for the selected item in a custom location such as a user-defined folder. Accordingly, the item alias can be removed from the centralized location and stored in the user-defined folder. For example, the user may wish to store all items associated with a particular project in a folder. Some items may be stored in an email application, while other items may be stored in a file explorer, and still others in a cloud storage platform. In contrast to existing solutions, the user can utilize the item storage interface control to unify access to the items regardless of the original location of the items. In this way, the user experience is greatly streamlined thereby increasing productivity, conserving computing resources, and reducing network congestion.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2 illustrates the expanded item storage interface control exposing a modified set of functionalities in response to the user selecting a folder.

FIG. 3 illustrates the expanded item storage interface control exposing a modified set of functionalities based on an item type of the selected item.

DETAILED DESCRIPTION

The techniques described herein provide systems for enhancing the management of digital items through the introduction of an item storage interface control. As such, the disclosed system addresses several technical challenges associated with unifying item keeping across many disparate platforms and item types. While some existing solutions may support pinning or favoriting items, they can be limited to certain item types and/or platforms. In contrast, the item storage interface control can be a component of an operating system that underlies the various applications installed on a user device (e.g., a laptop or a tablet). As such, a user can access the item storage interface control in any context or application. In this way, item aliases stored by the disclosed system can also be accessed in any context.

Furthermore, the disclosed system can greatly streamline human interaction with digital items by enabling unified item keeping or storage. As mentioned above, providing access to the item storage interface control in any context can reduce the number of inputs required for a user to reach a desired item. In this way, the disclosed techniques can not only support any item type from any platform but also improve the user experience. In addition, the by streamlining the user experience in this way, the disclosed system can improve performance of computing devices by reducing the likelihood of inadvertent inputs thereby conserving computing resources.

Various examples, scenarios, and aspects that enable unified access to digital items irrespective of location, are described below with reference to FIGS. 1A-7.

Figure 1A:
FIG. 1A illustrates an example environment in which a system is configured to unify access to digital items through an item storage interface control.

FIG. 1A illustrates an example environment 100 that in which a user interface 102 displays a set of items 104 for viewing by a user. The user interface 102 can be part of a cloud storage platform, a local file explorer, or any other application which enables a user to view and/or manage various digital items such as documents, events, and folders. For each item 104, the user interface 102 can display a name 106, alongside additional information relating to the item 104 such as a time when the item was most recently opened 108, and an activity 110 associated with the item which can indicate a source of the item, a most recent action taken on the item, and so forth. For instance, the user interface 102 can indicate that a document, the whitepaper draft 112, was last opened 108 forty-two minutes ago and that the user shared the whitepaper draft 112 in a chat. In addition, the storage location of the item can be displayed as part of the name 106. As shown in FIG. 1A the same information can be shown for all of the items 104 (e.g., the budget review 114, the ideation brainstorm 116, the team survey 118, and the marketing expo 120).

Furthermore, some items 104 may include associated items 122 which can be displayed by the user interface 102. For instance, a calendar event that represents the marketing expo 120 can have associated items 122 such as the meeting notes 124 and the sales analysis 126. These associated items 122 can be displayed alongside the marketing expo 120 to display their association. As will be discussed below, the user can manage the marketing expo 120 along with the associated items 122 as a group using the item storage interface control.

As shown on the left side of the user interface 102, various categories of items can be accessed such as recent items 128, a user's own items or "my files" 130, a favorites list 132, and shared items 134. In addition, various folders 136 can be displayed in the left portion of the user interface 102 for quick access by the user. In various examples, the user can select certain folders 136 to be displayed in the user interface 102. Alternatively, the folders 136 can be selected automatically based on user activity. For instance, if the user frequently accesses the inspiration folder 138, the system can include the inspiration folder 138 as part of the folders 136. In addition, the folders 136 can include locations that are shared amongst multiple users. For example, the tiger team folder 140 and the design team folder 142 can be accessed by a group of users and can be selected by the user or the system for display within the user interface 102.

Figure 1B:
FIG. 1B illustrates the example environment in which a user adds a selected item to a centralized location.

Turning now to FIG. 1B, the user can select an item 104 using a cursor 144. For instance, the user can hover over the whitepaper draft 112 using the cursor 144 or some other user-controlled pointer element (e.g., a finger touch) as shown in FIG. 1B. In response, a selection element 146 and a sharing element 148 can be displayed. In various examples, selecting an item 104 can include clicking on the item 104 with the cursor 144, hovering over the item 104 using the cursor 144, or tapping on the item 104 using a touch input from a stylus or other touch device. Selecting the sharing element 148, the user can be enabled to share the whitepaper draft 112 with other users. Alternatively, the user can select the selection element 146 to add the whitepaper draft 112 to the favorites 132. As will be shown and discussed below, the selection element 146 that is displayed in response to selecting the whitepaper draft 112 can be considered an initial or first component of the item storage interface control. In addition, the selection element 146, the sharing element 148, or other elements of the user interface 102 can be implemented as selectable interface elements such as buttons, icons, and so forth.

Figure 1C:
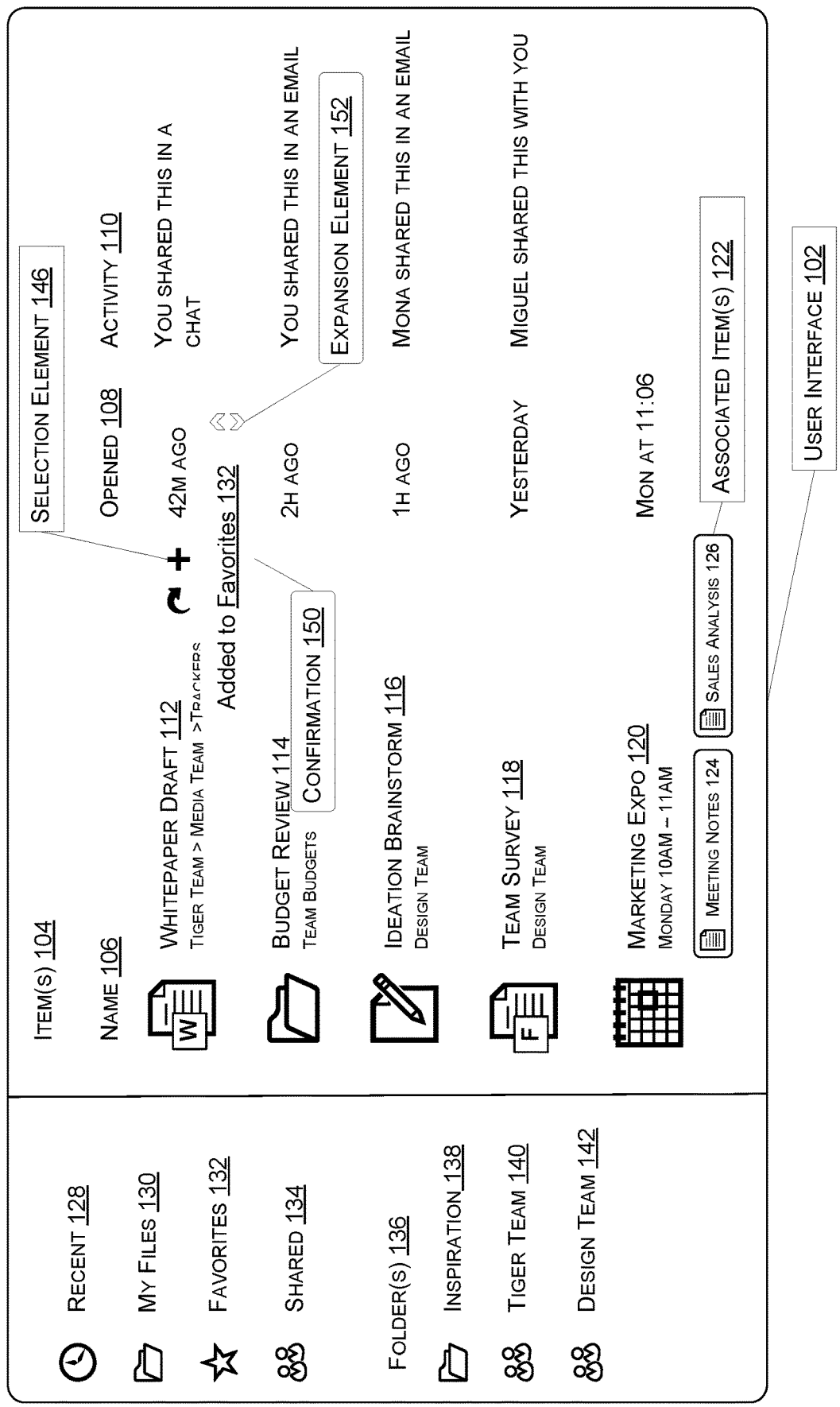
FIG. 1C illustrates the example environment in which the system displays a confirmation for adding the selected item to the centralized location along with an expansion element for exposing additional functionality.

As shown in FIG. 1C, in response to activating the selection element 146 using the cursor 144, an item alias associated with the whitepaper draft 112 can be generated and stored at a centralized location. In one example, the centralized location can be the favorites 132. Accordingly, the system can display a confirmation 150 indicating to the user that the whitepaper draft 112 was added to the favorites 132. In addition, the confirmation 150 can include an expansion element 152. As will be elaborated upon below, activating the expansion element 152 can enable the user to access additional functionality of the item storage interface control. Furthermore, the confirmation 150 can include a link to the current destination of the selected item as shown by the underlining. In this way, the user can quickly navigate to the new destination of the whitepaper draft 112. As mentioned above with respect to the selection element 146, the confirmation 150 can similarly be considered a second element of the item storage interface control.

Figure 1D:
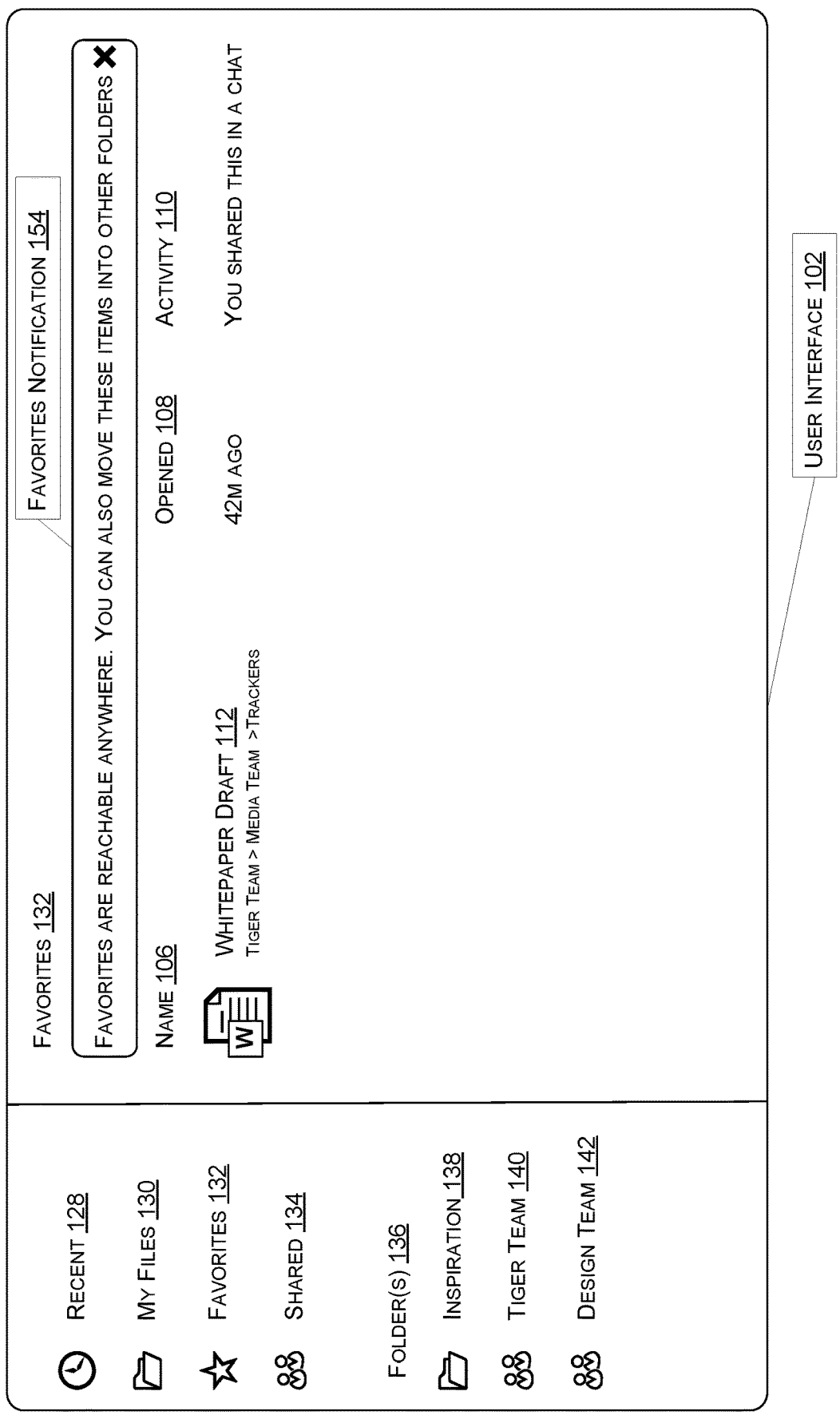
FIG. 1D illustrates the centralized location in which item aliases can be stored.

Turning now to FIG. 1D, as items are placed within the favorites 132 section, they can accordingly be accessed within the same user interface 102. For example, as illustrated in FIG. 1D, the whitepaper draft 112 is now accessible through the favorites 132 section in response to the user selection of the selection element 146. In one example, the user may have performed the favoriting action on the whitepaper draft 112 on a laptop computer where the whitepaper draft 112 can be originally stored. Now that the whitepaper draft 112 is placed within the favorites 132 section, it is now accessible from any device the user may wish to use. For instance, the user may wish to access the whitepaper draft 112 from a tablet computer at a different location. To communicate this functionality to the user, the user interface 102 can include a favorites notification 154. In addition, the favorites notification 154 can indicate that items 104 within the favorites 132 section can be moved into other folders.

In various examples, the file data defined by the whitepaper draft 112 can be moved to the favorites 132 section. Alternatively, as will be elaborated upon below, the file data for the whitepaper draft 112 may remain at the original storage location while an item alias can be generated that represents the whitepaper draft 112. Accordingly, the item alias can be stored within the favorites 132 section. In this way, the user can save items 104 from any source without concern for compatibility of item types or location and unify access to items 104 from any location or platform.

Figure 1E:
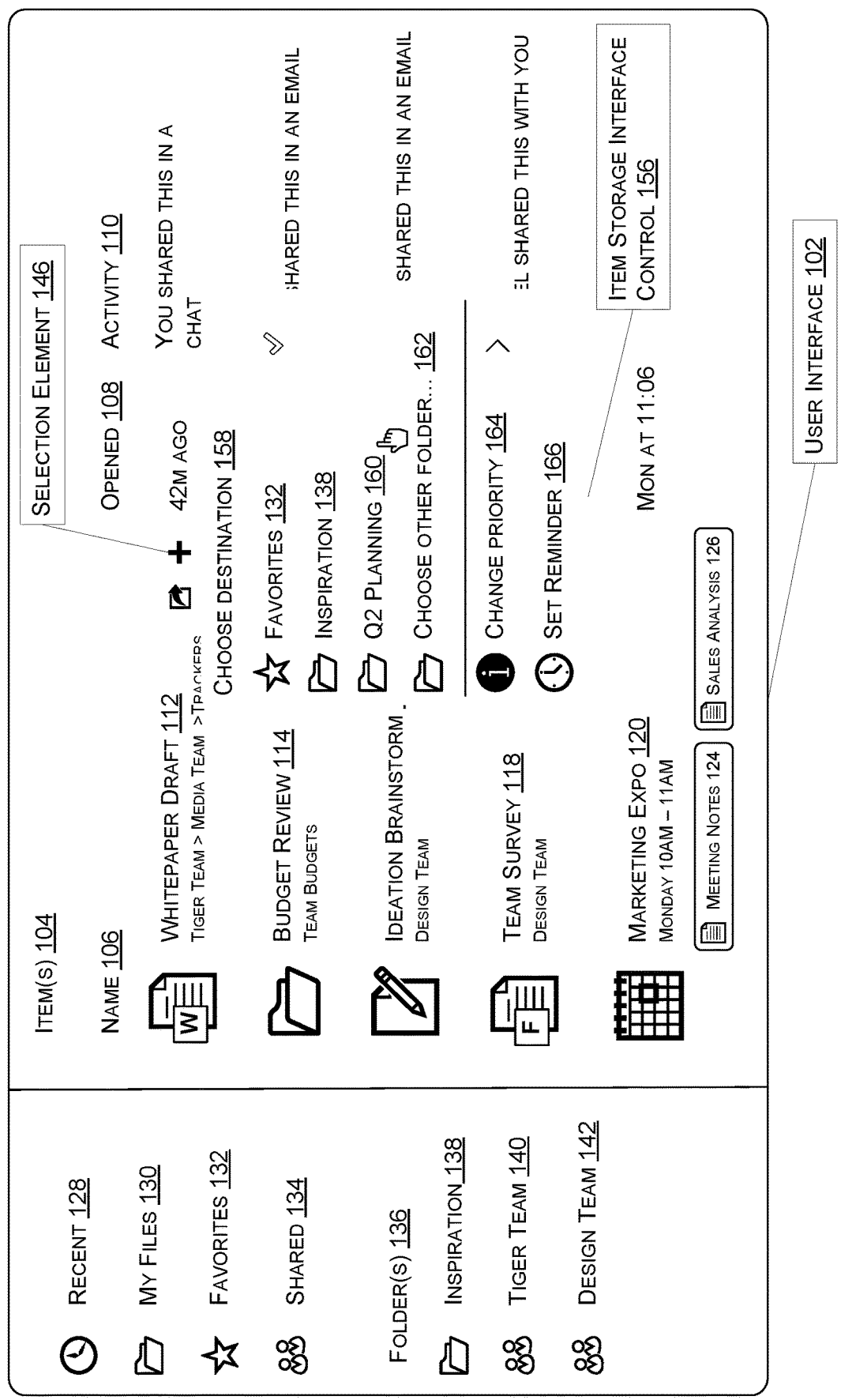
FIG. 1E illustrates an expanded item storage interface control to enable a user to select a custom destination for an item alias associated with the selected item.

Proceeding now to FIG. 1E, an example scenario in which the user selects the expansion element 152 illustrated in FIG. 1C is shown and described. As mentioned above, selecting the expansion element can enable the user to access additional functionality of the item storage interface control 156. For example, the item storage interface control 156 can enable the user to select or choose a specific destination 158 for a selected item 104 or a group of items 104. As shown in FIG. 1E, the item storage interface control 156 can indicate a current location of an item alias for the whitepaper draft 112. In this scenario, the item alias for the whitepaper draft 112 is currently stored in the favorites 132 as shown by the tick or check mark. Subsequently, the user may choose to store the whitepaper draft 112 in the inspiration folder 138 or the Q2 planning folder 160. Accordingly, the item alias for the whitepaper draft 112 can be removed from the favorites 132 and moved to the inspiration folder 138 or the Q2 planning folder 160.

Alternatively, the user may elect to choose another folder 162. As will be shown and discussed with respect to FIG. 1G, selecting the other folder option 162 can cause a display of an additional interface element to enable the user to access further granularity for selecting a destination 158. In addition, the item storage interface control 156 can enable the user to choose a priority 164 for the selected item 104. For example, the whitepaper draft 112 can be assigned a high priority 164. Accordingly, the whitepaper draft 112 can be displayed first in various contexts to ensure the user is cognizant of the whitepaper draft 112 as an important item 104. Furthermore, the item storage interface control 156 can also enable the user to set a reminder 166 for the selected item 104. In various examples, the reminder 166 can define a specific time (e.g., three o'clock PM) at which the reminder 166 can be displayed to the user. Alternatively, the reminder can define an interval of time (e.g., one hour) that elapses before the reminder 166 can be displayed.

Figure 1F:
FIG. 1F illustrates the example environment in which the system displays a confirmation for adding the selected item to a user-defined folder along with the expansion element.

Turning now to FIG. 1F, in response to selecting the Q2 planning folder 160, the user interface 102 can display a folder confirmation 168 indicating that the item alias for the whitepaper draft 112 is now stored at the selected destination 158. As with the confirmation 150 discussed above, the folder confirmation 168 can include a link to the Q2 planning folder 160 to allow the user to quickly navigate to the selected destination 158. In addition, the folder confirmation 168 can also include the expansion element 152 to enable the user to return to the item storage interface control 156. For instance, if the user wishes to change the destination 158 for the whitepaper draft 112 the expansion element 152 can allow the user to do so with minimal additional inputs. Alternatively, the user may select multiple folders in which to store the item alias for the whitepaper draft 112. For instance, selecting a destination 158 for an item alias currently stored in the favorites 132 can cause the item alias to be removed from the favorites 132. The disclosed system can also generate multiple instances of an item alias to store at multiple corresponding destinations 158. For instance, the user may elect to store the whitepaper draft 112 in the inspiration folder 138 as well as the Q2 planning folder 160. Alternatively, the user may choose to keep an item alias in the favorites 132 while also selecting a destination 158 to store the item alias such as the inspiration folder 138. It should be understood that when selecting a destination 158 for the whitepaper draft 112, an item alias associated with the whitepaper draft 112 can be stored at the selected destination while the original location of the whitepaper draft 112 remains unchanged.

Figure 1G:
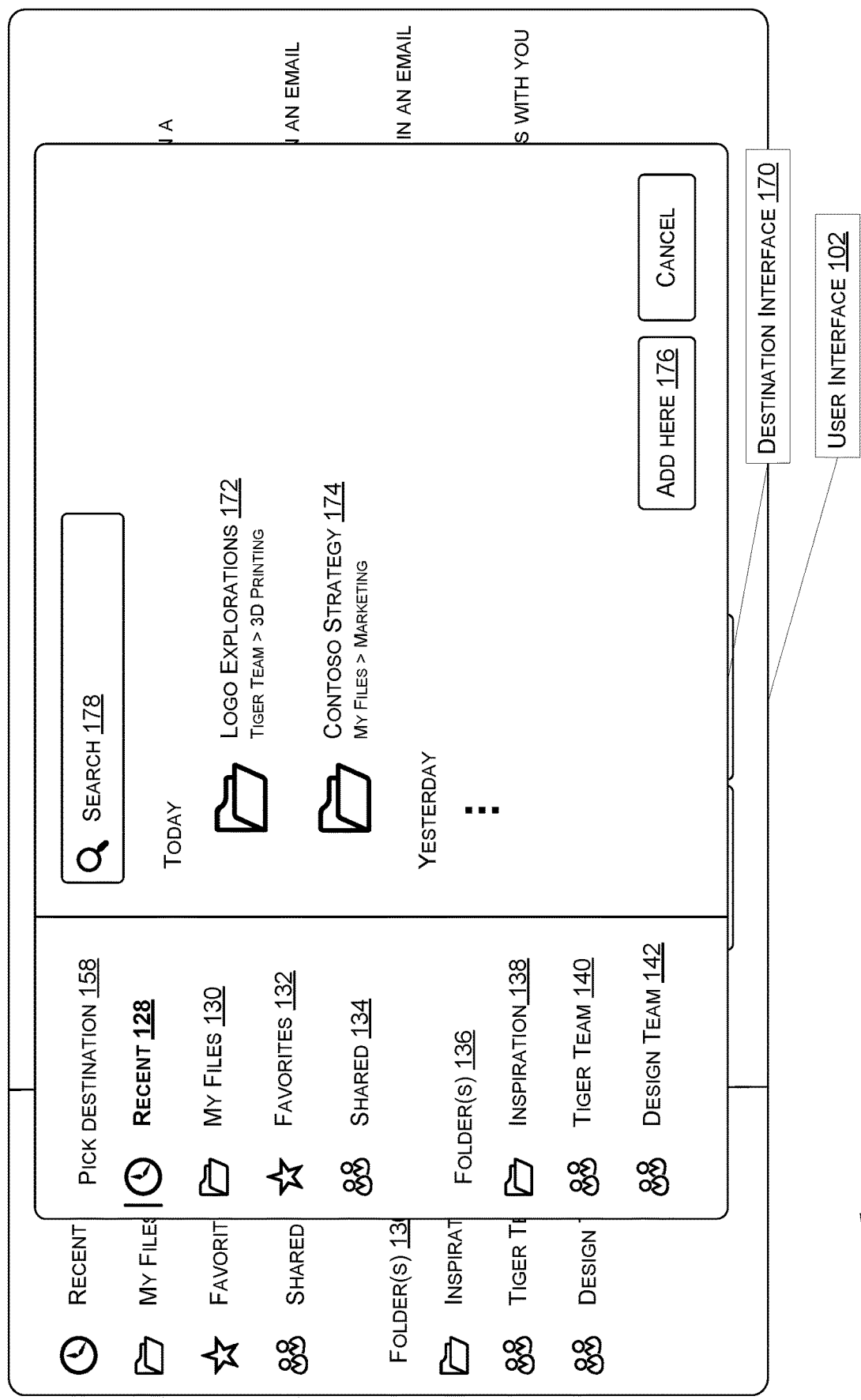
FIG. 1G illustrates a destination picker that can be summoned via the item storage interface control.

Proceeding now to FIG. 1G, aspects of a destination interface 170 are shown and described. As mentioned above, the user can elect to choose another folder 162 via the item storage interface control 156. In response, the destination interface 170 can be displayed to enable the user to navigate to a specific destination 158 of their choosing. Similar to the lefthand portion of the user interface 102, the destination interface 170 can display various locations to which the user can navigate. For instance, as shown in FIG. 1G, the user is currently viewing recent locations 128 as shown by the bold text and selection indicator. Locations within the recent locations 128 can be organized in chronological order according to most recent accesses. From here, the user can select a destination such as the logo explorations folder 172 or the contoso strategy folder 174. Accordingly, an item alias for the selected item 104 can be generated and stored in the logo explorations folder 172 for access from any device and/or platform without changing the location of the selected item 104.

Alternatively, the user may choose to create a new destination 158 using the add here interface element 176. In response, a new destination 158 can be created at the current location viewed by the user. In this example, the current location is the recent locations 128 and the new destination 158 can be a folder. In another example, the user may have navigated into a particular location such as the contoso strategy folder 174. By selecting the add here interface element 176, a subfolder can be created within the contoso strategy folder 174. It should be understood that a new destination 158 can be created using the add here interface element 176 at any location through the destination interface 170. Furthermore, the destination interface 170 can enable the user to search for a particular location by name using a search bar 178.

Figure 2:
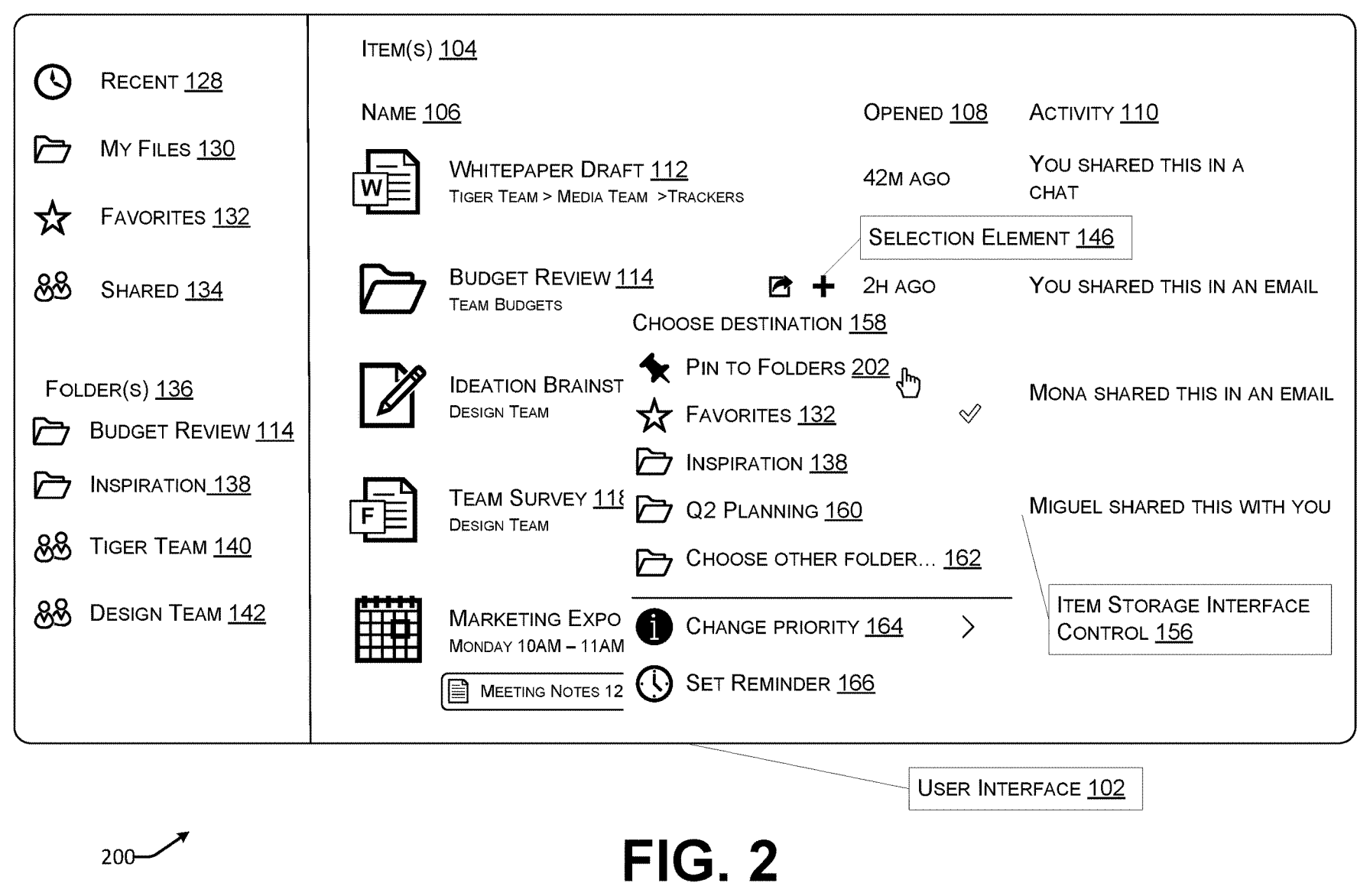

Turning now to FIG. 2, an alternative configuration of the item storage interface control 156 is shown and described. In this scenario, the user may select the budget review folder 114. Since a folder can differ from an individual item 104 in various properties, the item storage interface control 156 can accordingly expose a modified set of functionalities. For example, the user can still select a destination 158 for the budget review folder 114. In addition, the item storage interface control 156 can further enable the user to pin 202 the budget review folder 114 to the folders section 136 within the lefthand side of the user interface 102. Accordingly, the design review folder 114 can be displayed within the folders section 136 of the user interface 102. While a specific example of modified functionality is shown in FIG. 2, it should be understood that any additional functionality can be automatically added to the item storage interface control 156 in response to selecting a folder as opposed to an individual item 104.

Figure 3:
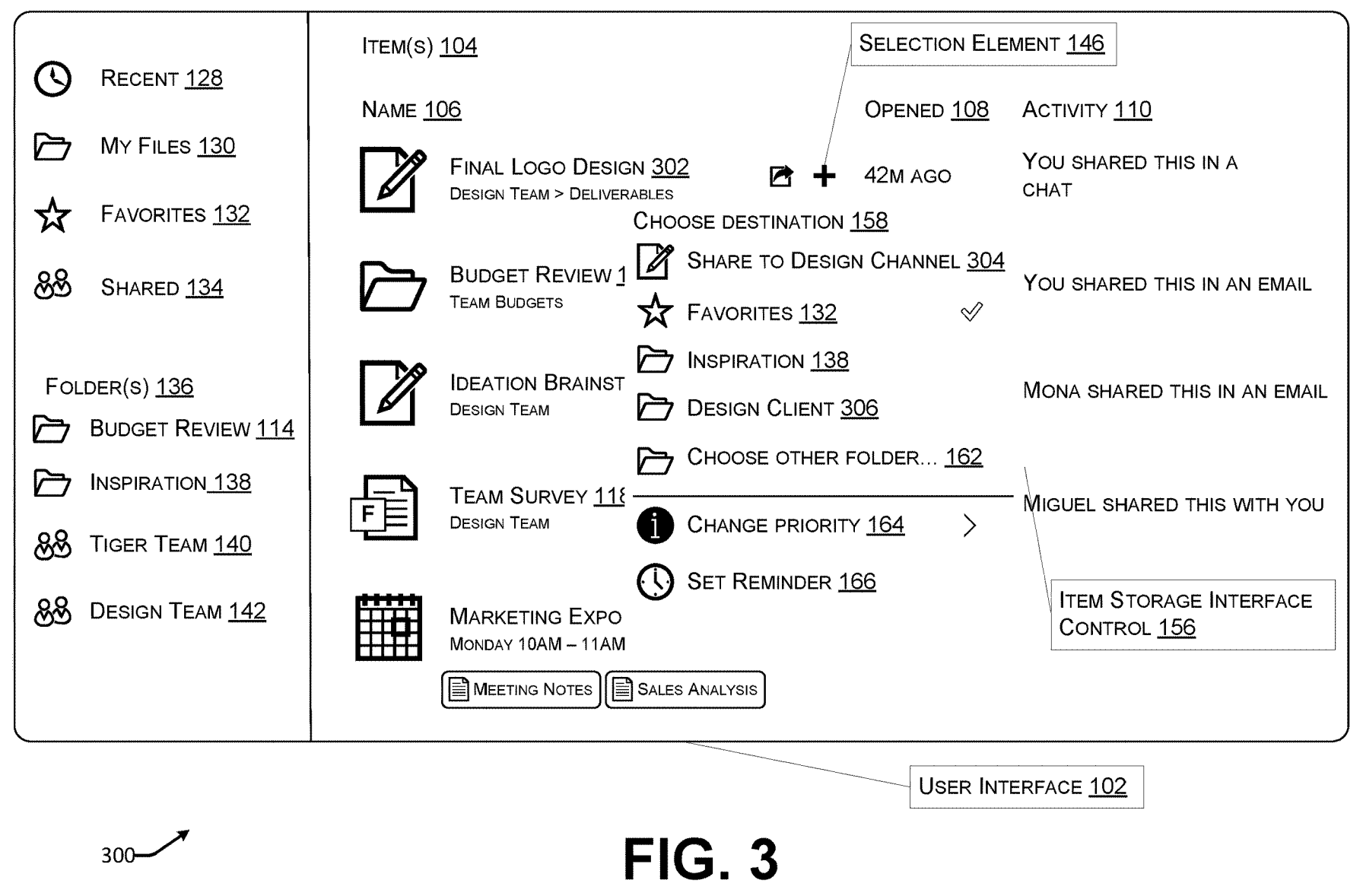

Furthermore, as shown in FIG. 3, the functionality of the item storage interface control 156 can also be modified based on an item type of the selected item 104. For example, the user may select the final logo design 302 which can be a digital design file. As such, the system can detect that the user has selected the final logo design 302 and detect the item type as a digital design file. In response, the item storage interface control 156 can expose a set of functionalities that is specific to digital design files. For example, the item storage interface control 156 may detect that the user is part of a design channel within a communication application. Accordingly, the item storage interface control 156 may suggest that the user share the final logo design 302 to the design channel 304.

In another example of modified functionality, the item storage interface control 156 may suggest a destination 158 for the final logo design 302 in response to detecting the item type. For instance, the item storage interface control 156 can suggest the design client folder 306. In various scenarios, the item storage interface control 156 can suggest a destination based on an item type, a name of the item, and/or a storage location of the item. For example, the item storage interface control 156 can suggest the design client 306 as a destination 158 based on the item type as well as the name of the final logo design 302. The system can determine final logo design 302 possesses a level of relevance to the design client 306 and suggest the destination accordingly.

Figure 4:
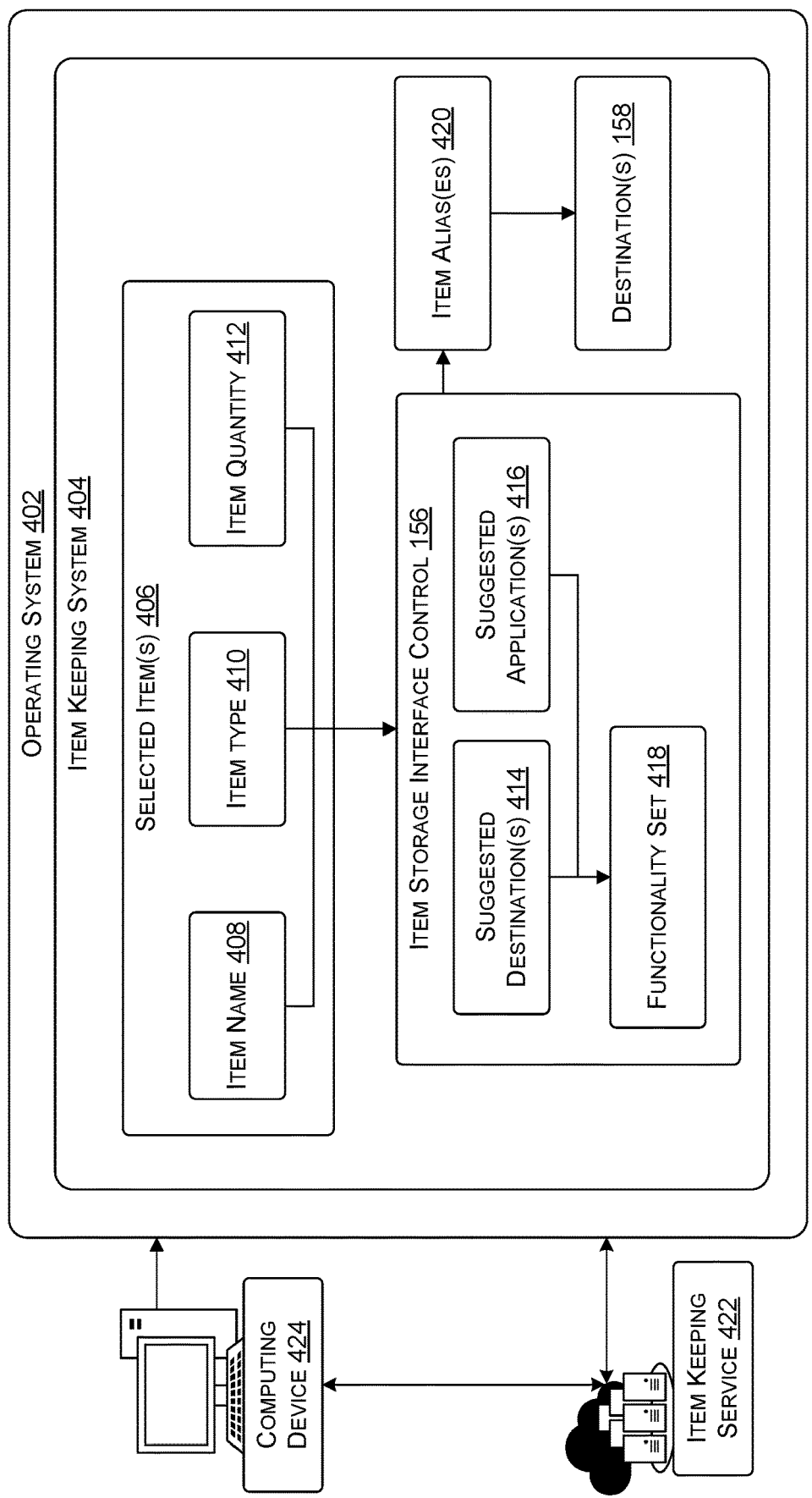
FIG. 4 is a block diagram for a system to unify access to digital items through an item storage interface control.

Proceeding now to FIG. 4, additional details of the disclosed system that enable the various features of the item storage interface control 156 are shown and described. As mentioned above, the item storage interface control 156 can be a component of an operating system 402 that enables the user to access the item storage interface control 156 in any context or application. For instance, while the examples described above are shown in the context of a file explorer, the user may also utilize the item storage interface control 156 in a web browser. In one example, the user may highlight a block of text in a webpage that they wish to save in the favorites 132. The user can select the block of text which can cause the operating system 402 to activate the item keeping system 404 and display the item storage interface control 156.

In this example, the block of text can be the selected item 406. In response to the user selecting the item 406, the item keeping system 404 can extract various information regarding the selected item 406. For example, as mentioned above, the item name 408 and item type 410 can be extracted to inform various aspects of the item storage interface control 156. In addition, an item quantity 412 can be extracted from the selected item 406. For instance, the user may select several items within a file explorer that they wish to store at a certain destination 158.

Using the various pieces of information extracted from the selected item or group of items 406, the item keeping system 404 can configured the item storage interface control 156. For example, the item keeping system 404 can determine one or several suggested destinations 414 based on the item name 408, item type 410, and/or the item quantity 412. In addition, the item keeping system 404 can select suggested applications 416 which can view or edit the selected item 406. This selection can be based on the item type 410, for instance, in response to detecting an image item type 410, the item keeping system 404 can select a photo editing application as a suggested application 416.

The suggested destinations 414 and the suggested applications 416 can be included as part of the functionality set 418. In addition, the functionality set can define various features of the item storage interface control 156 that can be accessed by a user for a selected item 406. In various examples, the functionality set 418 can be some but not all of the features of the item storage interface control 156. For instance, while the item keeping system 404 can support sharing a selected item 406 via the item storage interface control 156, the item keeping system 404 may elect not to enable sharing based on the context derived from the selected item 406. In this way, the item keeping system 404 can select features that are most relevant to the selected item 406 and prevent overwhelming the user. However, it should be understood that the item storage interface control 156 can be configured to expose all features for interacting with a selected item 406.

Once the item keeping system 404 displays the item storage interface control 156 to the user, the user can select a destination 158 at which to save the selected item 406. In response, the item keeping system 404 can generate an item alias 420 that represents the selected item 406. In various examples, the item alias 420 can be a shortcut to the selected item 406 which may be stored at an original location that is different from the destination 158. Alternatively, the item alias 420 can be a copy of the data defined by the selected item 406. For instance, consider the block of text selected from the webpage as the selected item 406. In this example, the item alias 420 can be a text document that includes the block text from the selected item 406. In another configuration, the item alias 420 can be a link to the particular webpage from which the block of text originated.

In another example, the selected item 406 can be a digital design file that is stored locally on a computing device belonging to the user. However, the user may select a destination 158 that is a shared folder which can be accessed by multiple users over a network connection. As such, the item alias 420 can be a reconfigured version of the selected item 406 to enable access by the other users while maintaining the original digital design file at its original location.

The selection of the type of item alias 420 can be based on the various characteristics of the selected item 406. For example, the item alias 420 can be based on the item type 410 where a large and complex selected item 406 such as a 3D model may warrant an item alias 420 that links to the selected item 406 rather than replicate the selected item 406. Conversely, a selected item 406 that is small in size such as a snippet of text or an image can benefit from an item alias 420 that replicates the data defined by the selected item 406 to minimize load times or other latencies. In various examples, the item alias 420 can be configured by the item keeping system 404 based on the selected item 406. It should be understood that the item alias 420 can be any format that enables storage of the selected item 406 at the selected destination 158 irrespective of the original location of the selected item 406. In addition, item aliases 420 can be accessed from any device or platform that is configured with the item keeping system 404 as a component of the operating system 402.

Furthermore, the item keeping system 404 can be a component of an item keeping service 422. In various examples, the item keeping service 422 can be provided as a cloud service to enable unified storage and access to item aliases 420. Access to the item keeping system 404 and consequently the item storage interface control 156, can be governed by a subscription or other form of access to the item keeping service 422. For example, a user may interact locally with the item keeping system 404 as a component of the operating system 402 via a computing device 424. However, the user may be prevented from utilizing some or all of the features of the item keeping system 404 if the computing device 424 is not connected to the item keeping service 422.

Figure 5:
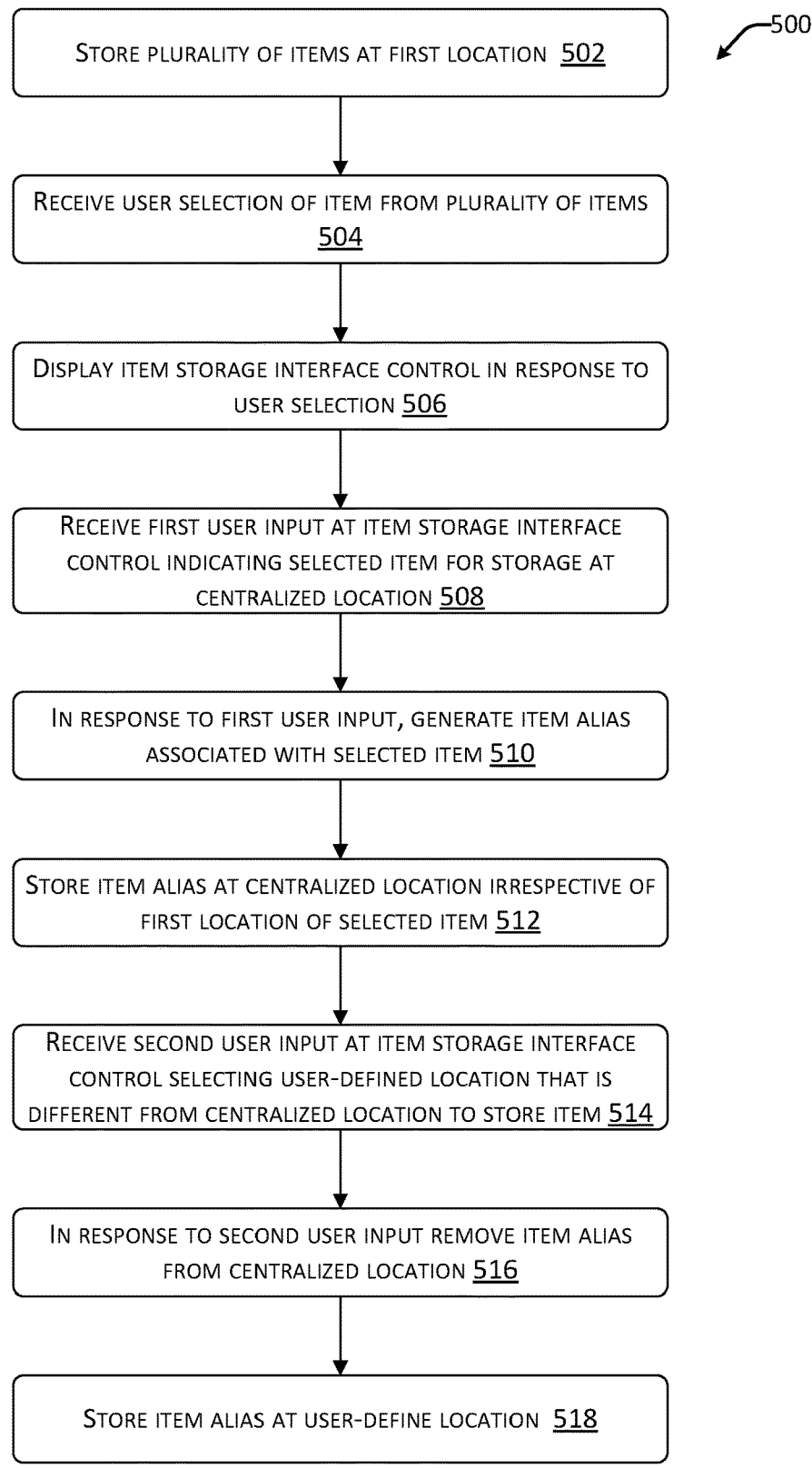
FIG. 5 is a flow diagram showing aspects of a routine for unifying access to digital items through an item storage interface control.

Turning now to FIG. 5, aspects of a routine 500 for enabling unified access to items irrespective of original location are shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, routine 500 begins at operation 502 where a system stores a plurality of items at a first location.

Next, at operation 504, the system receives a user selection of an item from the plurality of items at the first location.

Then, at operation 506, the system displays an item storage interface control in response to the user selection of the item.

Subsequently, at operation 508, the system receives a first user input at the item storage interface control indicating the selected item for storage at a centralized location.

Then, at operation 510, in response to the first user input, the system generates an item alias that is associated with the selected item.

Next, at operation 512, the system stores the item alias at a centralized location irrespective of the first location of the selected item.

Then, at operation 514, the system receives a second user input at the item storage interface control selecting a user-defined location that is different from the centralized location to store the item.

Next, at operation 516, in response to the second user input, the system removes the item alias from the centralized location.

Finally, at operation 518, the system stores the item alias at the user-defined location.

Figure 6:
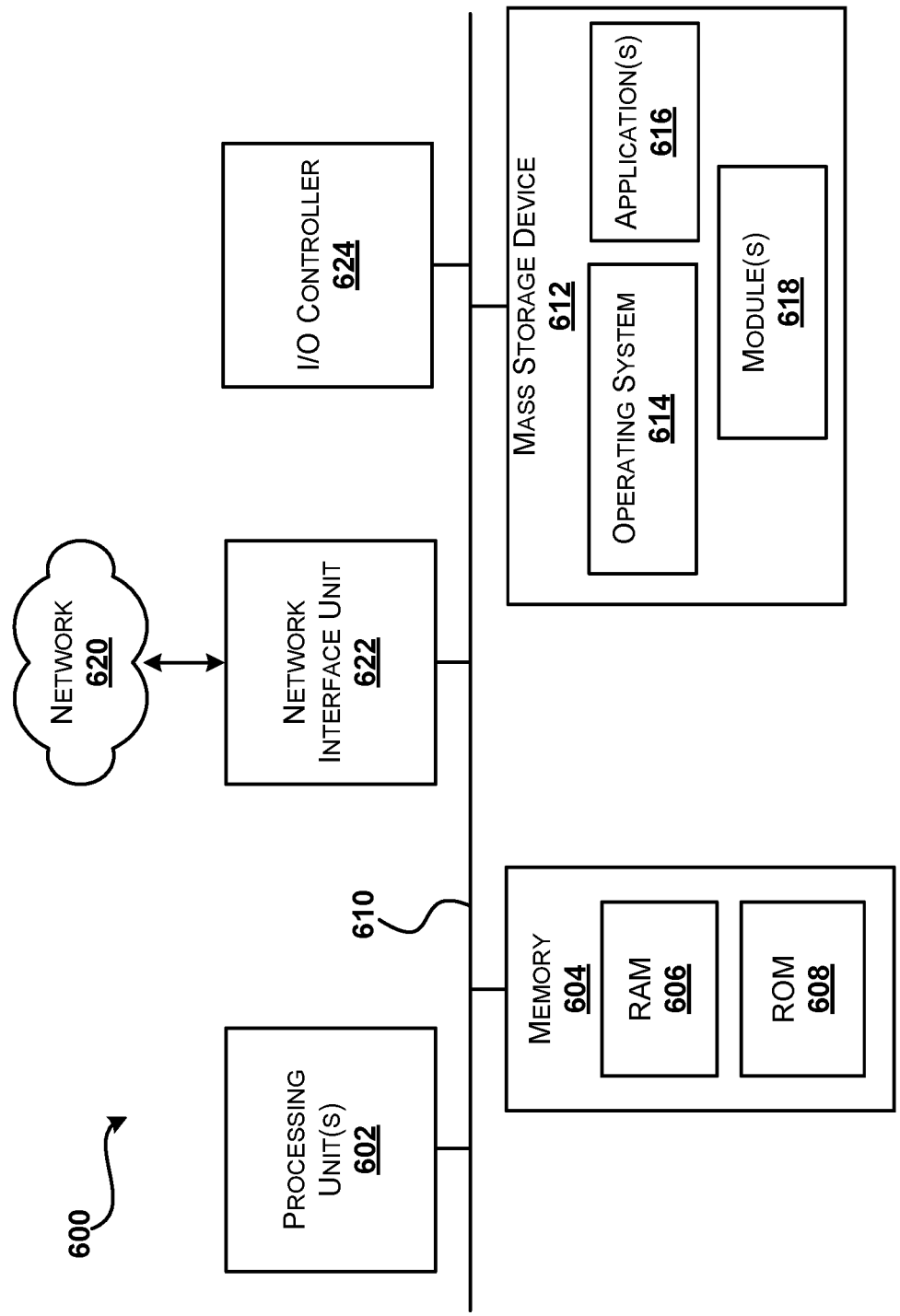
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing unit(s) 602, a system memory 604, including a random-access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

Figure 7:
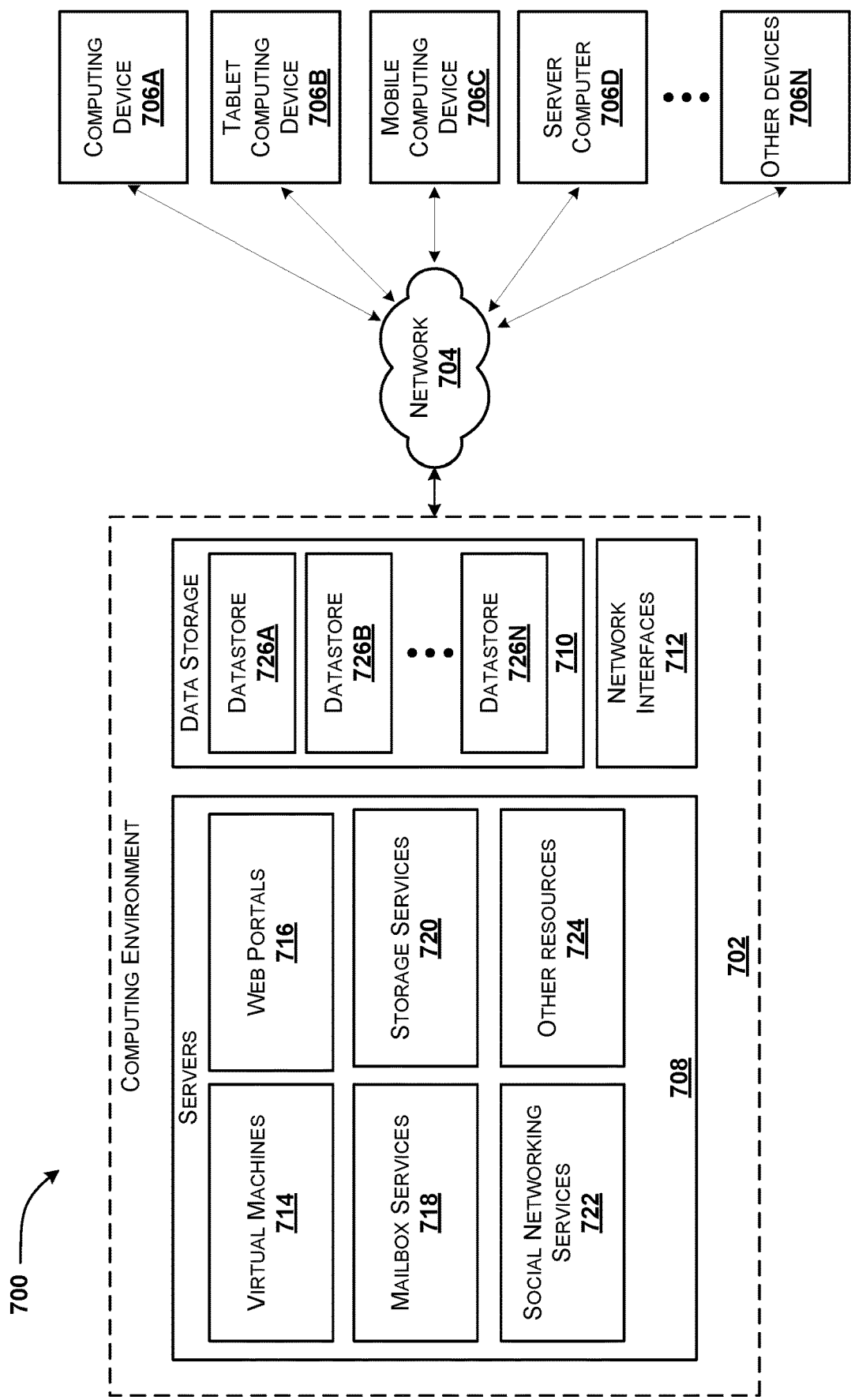
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "clients 706" and also referred to herein as computing devices 706) can communicate with the computing environment 702 via the network 704. In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: storing a plurality of items at a first location; receiving a user selection of an item of the plurality of items; displaying an item storage interface control in response to the user selection of the item; receiving a first user input at the item storage interface control indicating the selected item of the plurality of items for storage at a centralized location; in response to the first user input, generating an item alias associated with the selected item; storing the item alias at the centralized location irrespective of the first location of the selected item; receiving a second user input at the item storage interface control selecting a user-defined location that is different from the centralized location; in response to the second user input, removing the item alias from the centralized location; and storing the item alias in the user-defined location.

Example Clause B, the method of Example Clause A, wherein the centralized location is a predetermined default item location.

Example Clause C, the method of Example Clause A or Example Clause B, wherein the user-defined folder stores a plurality of item aliases, each item alias of the plurality of item aliases being associated with an item that is stored at a location that is different from the user-defined folder.

Example Clause D, the method of any one of Example Clause A through C, wherein the plurality of items at the first location originates from the same application.

Example Clause E, the method of any one of Example Clause A through D, wherein a functionality of the item storage interface control is determined based on a name of the selected item.

Example Clause F, the method of any one of Example Clause A through E, wherein a functionality of the item storage interface control is modified in response to a user input selecting two or more items of the plurality of items.

Example Clause G, the method of any one of Example Clause A through F, wherein the item storage interface control is an operating system component for centralizing storage of item aliases.

Example Clause H, the method of any one of Example Clause A through G, further comprising: detecting an item type of the selected item; and in response to detecting the item type of the selected item, causing a display of one or more suggested user-defined locations within the item storage interface control based on the item type.

Example Clause I, a system comprising: one or more processing units; and a computer-readable medium having encoded thereon computer-readable instructions that, when executed by the one or more processing units, cause the system to: store a plurality of items at a first location; receive a user selection of an item of the plurality of items; display an item storage interface control in response to the user selection of the item; receive a first user input at the item storage interface control indicating the selected item of the plurality of items for storage at a centralized location; in response to the first user input, generate an item alias associated with the selected item; store the item alias at the centralized location irrespective of the first location of the selected item; receive a second user input at the item storage interface control selecting a user-defined location that is different from the centralized location; in response to the second user input, remove the item alias from the centralized location; and store the item alias in the user-defined location.

Example Clause J, the system of Example Clause I, wherein the item storage interface control is an operating system component for centralizing storage of item aliases.

Example Clause K, the system of Example Clause I or Example Clause J, wherein the user-defined folder stores a plurality of item aliases, each item alias of the plurality of item aliases being associated with an item that is stored at a location that is different from the user-defined folder.

Example Clause L, the system of any one of Example Clause I through K, wherein a functionality of the item storage interface control is determined based on a name of the selected item.

Example Clause M, the system of any one of Example Clause I through L, wherein a functionality of the item storage interface control is modified in response to a user input selecting two or more items of the plurality of items.

Example Clause N, the system of any one of Example Clause I through M, wherein the computer-readable instructions further cause the system to: detect an item type of the selected item; and in response to detecting the item type of the selected item, cause a display of one or more suggested user-defined locations within the item storage interface control based on the item type.

Example Clause O, a computer-readable storage medium having encoded thereon computer-readable instructions that when executed by a system cause the system to: store a plurality of items at a first location; receive a user selection of an item of the plurality of items; display an item storage interface control in response to the user selection of the item; receive a first user input at the item storage interface control indicating the selected item of the plurality of items for storage at a centralized location; in response to the first user input, generate an item alias associated with the selected item; store the item alias at the centralized location irrespective of the first location of the selected item; receive a second user input at the item storage interface control selecting a user-defined location that is different from the centralized location; in response to the second user input, remove the item alias from the centralized location; and store the item alias in the user-defined location.

Example Clause P, the computer-readable medium of Example Clause O, wherein the item storage interface control is an operating system component for centralizing storage of item aliases.

Example Clause Q, the computer-readable medium of Example Clause O or Example clause P, wherein a functionality of the item storage interface control is determined based on a name of the selected item.

Example Clause R, the computer-readable medium of any one of Example Clause O through Q, wherein the user-defined folder stores a plurality of item aliases, each item alias of the plurality of item aliases being associated with an item that is stored at a location that is different from the user-defined folder.

Example Clause S, the computer-readable medium of any one of Example Clause O through R, wherein a functionality of the item storage interface control is modified in response to a user input selecting two or more items of the plurality of items.

Example Clause T, the computer-readable medium of any one of Example Clause O through S, wherein the computer-readable instructions further cause the system to: detect an item type of the selected item; and in response to detecting the item type of the selected item, cause a display of one or more suggested user-defined locations within the item storage interface control based on the item type.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different files).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
    storing a plurality of items at a first location;
    receiving a user selection of an item of the plurality of items;
    displaying an item storage interface control in response to the user selection of the item;
    receiving a first user input at the item storage interface control indicating the selected item of the plurality of items for storage at a centralized location;
    in response to the first user input, generating an item alias representing content of the selected item;
    storing the item alias at the centralized location irrespective of the first location of the selected item, wherein the first location of the selected item is unchanged in response to the first user input;
    receiving a second user input at the item storage interface control selecting a user-defined location that is different from the centralized location;
    in response to the second user input, removing the item alias from the centralized location; and
    storing the item alias in the user-defined location irrespective of the first location of the selected item, wherein the first location of the selected item is unchanged in response to the second user input.

2. The method of claim 1, wherein the centralized location is a predetermined default item location.

3. The method of claim 1, wherein the user-defined folder stores a plurality of item aliases, each item alias of the plurality of item aliases being associated with an item that is stored at a location that is different from the user-defined folder.

4. The method of claim 1, wherein the plurality of items at the first location originates from the same application.

5. The method of claim 1, wherein a functionality of the item storage interface control is determined based on a name of the selected item.

6. The method of claim 1, wherein a functionality of the item storage interface control is modified in response to a user input selecting two or more items of the plurality of items.

7. The method of claim 1, wherein the item storage interface control is an operating system component for centralizing storage of a plurality of item aliases representing content of a corresponding plurality of items comprising disparate file formats originating from a plurality of source locations.

8. The method of claim 1, further comprising:
   detecting an item type of the selected item; and
   in response to detecting the item type of the selected item, causing a display of one or more suggested user-defined locations within the item storage interface control based on the item type.

9. A system comprising:
   one or more processing units; and
   a computer storage medium having encoded thereon computer-readable instructions that, when executed by the one or more processing units, cause the system to:
      store a plurality of items at a first location;
      receive a user selection of an item of the plurality of items;
      display an item storage interface control in response to the user selection of the item;
      receive a first user input at the item storage interface control indicating the selected item of the plurality of items for storage at a centralized location;
      in response to the first user input, generate an item alias representing content of the selected item;
      store the item alias at the centralized location irrespective of the first location of the selected item, wherein the first location of the selected item is unchanged in response to the first user input;
      receive a second user input at the item storage interface control selecting a user-defined location that is different from the centralized location;
      in response to the second user input, remove the item alias from the centralized location; and
      store the item alias in the user-defined location irrespective of the first location of the selected item, wherein the first location of the selected item is unchanged in response to the second user input.

10. The system of claim 9, wherein the item storage interface control is an operating system component for centralizing storage of a plurality of item aliases representing content of a corresponding plurality of items comprising disparate file formats originating from a plurality of source locations.

11. The system of claim 9, wherein the user-defined folder stores a plurality of item aliases, each item alias of the plurality of item aliases being associated with an item that is stored at a location that is different from the user-defined folder.

12. The system of claim 9, wherein a functionality of the item storage interface control is determined based on a name of the selected item.

13. The system of claim 9, wherein a functionality of the item storage interface control is modified in response to a user input selecting two or more items of the plurality of items.

14. The system of claim 9, wherein the computer-readable instructions further cause the system to:
   detect an item type of the selected item; and
   in response to detecting the item type of the selected item, cause a display of one or more suggested user-defined locations within the item storage interface control based on the item type.

15. A computer storage medium having encoded thereon computer-readable instructions that when executed by a system cause the system to:
   store a plurality of items at a first location;
   receive a user selection of an item of the plurality of items;
   display an item storage interface control in response to the user selection of the item;
   receive a first user input at the item storage interface control indicating the selected item of the plurality of items for storage at a centralized location;
   in response to the first user input, generate an item alias representing content of the selected item;
   store the item alias at the centralized location irrespective of the first location of the selected item, wherein the first location of the selected item is unchanged in response to the first user input;
   receive a second user input at the item storage interface control selecting a user-defined location that is different from the centralized location;
   in response to the second user input, remove the item alias from the centralized location; and
   store the item alias in the user-defined location irrespective of the first location of the selected item, wherein the first location of the selected item is unchanged in response to the second user input.

16. The computer-readable storage medium of claim 15, wherein the item storage interface control is an operating system component for centralizing storage of a plurality of item aliases comprising a plurality of file formats originating from a plurality of source locations.

17. The computer storage medium of claim 15, wherein a functionality of the item storage interface control is determined based on a name of the selected item.

18. The computer storage medium of claim 15, wherein the user-defined folder stores a plurality of item aliases, each item alias of the plurality of item aliases being associated with an item that is stored at a location that is different from the user-defined folder.

19. The computer storage medium of claim 15, wherein a functionality of the item storage interface control is modified in response to a user input selecting two or more items of the plurality of items.

20. The computer storage medium of claim 15, wherein the computer-readable instructions further cause the system to:
   detect an item type of the selected item; and
   in response to detecting the item type of the selected item, cause a display of one or more suggested user-defined locations within the item storage interface control based on the item type.

* * * * *